(12) United States Patent
Kosuge et al.

(10) Patent No.: US 10,661,411 B2
(45) Date of Patent: May 26, 2020

(54) APPARATUS FOR CLEANING A POLISHING SURFACE, POLISHING APPARATUS, AND METHOD OF MANUFACTURING AN APPARATUS FOR CLEANING A POLISHING SURFACE

(71) Applicant: EBARA CORPORATION, Tokyo (JP)

(72) Inventors: Ryuichi Kosuge, Tokyo (JP); Hiroshi Sotozaki, Tokyo (JP); Takeshi Kodera, Tokyo (JP); Ryo Hasegawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 1120 days.

(21) Appl. No.: 14/944,066

(22) Filed: Nov. 17, 2015

(65) Prior Publication Data

US 2016/0144478 A1    May 26, 2016

(30) Foreign Application Priority Data

Nov. 20, 2014    (JP) .................................. 2014-235449

(51) Int. Cl.
| | | |
|---|---|---|
| *B24B 53/017* | (2012.01) | |
| *B24B 37/34* | (2012.01) | |
| *B23K 31/02* | (2006.01) | |
| *B23K 37/08* | (2006.01) | |
| *B23K 33/00* | (2006.01) | |
| *B23K 101/20* | (2006.01) | |

(52) U.S. Cl.
CPC ............ *B24B 53/017* (2013.01); *B23K 31/02* (2013.01); *B23K 33/006* (2013.01); *B24B 37/34* (2013.01); *B23K 2101/20* (2018.08)

(58) Field of Classification Search
None
See application file for complete search history.

(56) References Cited

U.S. PATENT DOCUMENTS

| | | | |
|---|---|---|---|
| 5,578,529 A | 11/1996 | Mullins | |
| 5,893,753 A | 4/1999 | Hempel, Jr. | |
| 5,942,037 A | 8/1999 | Wagener et al. | |
| 6,139,406 A | 10/2000 | Kennedy et al. | |
| 6,153,847 A * | 11/2000 | Nakatani ............. | B23K 9/0061 219/146.52 |

(Continued)

FOREIGN PATENT DOCUMENTS

| | | |
|---|---|---|
| CN | 202207530 U | 5/2012 |
| CN | 203317219 U | 12/2013 |

(Continued)

OTHER PUBLICATIONS

Machine Generated English Translation JP1996-330258. Published Dec. 13, 1996 (Year: 1996).*

(Continued)

*Primary Examiner* — Sylvia Macarthur
(74) *Attorney, Agent, or Firm* — BakerHostetler

(57) ABSTRACT

There is disclosed a polishing-surface cleaning apparatus to which a polishing liquid, such as slurry, is less likely to be attached. The polishing-surface cleaning apparatus includes an arm having a fluid passage, a nozzle communicating with the fluid passage, and a weld material securing the nozzle to the arm. The weld material fills a gap between a bottom surface of the arm and an edge of a front-end surface of the nozzle.

10 Claims, 11 Drawing Sheets

(56) References Cited

U.S. PATENT DOCUMENTS

| | | |
|---|---|---|
| 6,669,538 B2 | 12/2003 | Li et al. |
| 6,872,128 B1 | 3/2005 | Pham et al. |
| 2009/0189952 A1 | 7/2009 | Lee et al. |
| 2009/0305612 A1 | 12/2009 | Miyazaki et al. |
| 2013/0023186 A1 | 1/2013 | Motoshima et al. |
| 2014/0162536 A1 | 6/2014 | Umemoto et al. |
| 2016/0315002 A1* | 10/2016 | Komatsu ........... H01L 21/67288 |

FOREIGN PATENT DOCUMENTS

| | | |
|---|---|---|
| CN | 103707179 A | 4/2014 |
| JP | H08-330258 A | 12/1996 |
| JP | H10-197679 A | 7/1998 |
| JP | 2004-031924 A | 1/2004 |
| JP | 2004-146775 A | 5/2004 |
| JP | 2006-070032 A | 3/2006 |
| JP | 2007-000968 A | 1/2007 |
| JP | 2007-168039 A | 7/2007 |
| JP | 2010-050436 A | 3/2010 |
| JP | 2012-182371 A | 9/2012 |
| JP | 2013-066829 A | 4/2013 |
| JP | 2013-099828 A | 5/2013 |
| JP | 2014-111301 A | 6/2014 |

OTHER PUBLICATIONS

Machine Generated English Translation JP2014-075438.Published Apr. 24, 2014 (Year: 2014).*

Machine Generated English Translation JP2007-000968. Published Jan. 11, 2007 (Year: 2007).*

Machine Generated English Translation JP1998-196769.Published Jul. 34, 1998 (Year: 1998).*

Machine Generated English Translation of the claims of JP 10197679. Published Jul. 31, 1998. (Year: 1998).*

Machine Generated English Translation of the specification of JP 10197679. Published Jul. 31, 1998. (Year: 1998).*

Singapore Patent Application No. 10201509414R; Search Report; dated Feb. 7, 2018; 3 pages.

* cited by examiner

APPARATUS FOR CLEANING A POLISHING SURFACE, POLISHING APPARATUS, AND METHOD OF MANUFACTURING AN APPARATUS FOR CLEANING A POLISHING SURFACE

CROSS REFERENCE TO RELATED APPLICATION

This document claims priority to Japanese Patent Application Number 2014-235449 filed Nov. 20, 2014, the entire contents of which are hereby incorporated by reference.

BACKGROUND

Chemical mechanical polishing is a technique of polishing a surface of a wafer by bringing the wafer into sliding contact with a polishing surface while supplying a polishing liquid, which is called slurry, onto the polishing surface. The polishing surface is typically constituted by a surface of a polishing pad attached to a polishing table. After polishing of the wafer is performed, particles, such as polishing debris and abrasive grains contained in the polishing liquid, remain on the polishing surface. Thus, after polishing of the wafer, an atomized cleaning fluid (e.g., liquid or a mixture of liquid and gas) is sprayed from a polishing-surface cleaning device onto the polishing surface of the polishing pad, thereby cleaning the polishing surface. Such a polishing-surface cleaning device is called atomizer.

However, when the polishing surface is being cleaned, the polishing liquid is scattered from the polishing surface and may be attached to the polishing-surface cleaning device. In particular, the polishing liquid is likely to be collected on raised portions and in recessed portions which are present for nozzle arrangement on a lower surface of the polishing-surface cleaning device. The polishing liquid that has been attached to the polishing-surface cleaning device is dried, thus leaving solids, which are deposited on the polishing-surface cleaning device. As the deposition of the solids is repeated, the solids may fall onto the polishing surface, causing scratches on the wafer surface.

SUMMARY OF THE INVENTION

According to embodiments, there are provided a polishing-surface cleaning apparatus and a method of manufacturing a polishing-surface cleaning apparatus to which a polishing liquid, such as slurry, is less likely to be attached.

Embodiments, which will be described below, relate to a polishing-surface cleaning apparatus for cleaning a polishing surface which is used in polishing of a substrate, such as wafer. Further, an embodiment, which will be described below, relates to a polishing apparatus having a polishing-surface cleaning apparatus. Further, embodiments, which will be described below, relate to a method of manufacturing a polishing-surface cleaning apparatus.

In an embodiment, there is provided a polishing-surface cleaning apparatus for cleaning a polishing surface with a cleaning fluid, comprising: an arm having a fluid passage; a nozzle communicating with the fluid passage; and a weld material securing the nozzle to the arm, the weld material filling a gap between a bottom surface of the arm and an edge of a front-end surface of the nozzle.

In an embodiment, the bottom surface of the arm, a bottom surface of the weld material, and the front-end surface of the nozzle lie in substantially the same plane.

In an embodiment, the bottom surface of the arm, the bottom surface of the weld material, and the front-end surface of the nozzle lie in the same plane.

In an embodiment, a surface roughness Ra of the bottom surface of the arm, a bottom surface of the weld material, and the front-end surface of the nozzle is less than 3.2 µm.

In an embodiment, a projecting portion is formed on the front-end surface of the nozzle, and a fluid outlet is formed in the projecting portion.

In an embodiment, the projecting portion of the nozzle projects from the bottom surface of the arm by 0.1 mm to 0.2 mm.

In an embodiment, the bottom surface of the arm, the front-end surface of the nozzle, and a bottom surface of the weld material are constituted by flat surfaces.

In an embodiment, at least one of the nozzle and the arm is made of water-repellent material.

In an embodiment, at least one of the front-end surface of the nozzle and the bottom surface of the arm is covered with water-repellent material.

In an embodiment, there is provided a polishing apparatus comprising: a polishing table for supporting a polishing pad having a polishing surface; a polishing head configured to press a substrate against the polishing surface; and the above-described polishing-surface cleaning apparatus.

In an embodiment, there is provided a method of manufacturing a polishing-surface cleaning apparatus for cleaning a polishing surface with a cleaning fluid, comprising: inserting a nozzle into a recess formed in a bottom surface of an arm; and welding the nozzle to the arm, thereby filling a gap between the bottom surface of the arm and an edge of a front-end surface of the nozzle with a weld material.

In an embodiment, the method further comprises after welding the nozzle to the arm, cutting the bottom surface of the arm, a bottom surface of the weld material, and the front-end surface of the nozzle until the bottom surface of the arm, the bottom surface of the weld material, and the front-end surface of the nozzle lie in the same plane.

In an embodiment, said cutting the front-end surface of the nozzle comprises cutting a region of the front-end surface which includes the edge of the front-end surface of the nozzle and does not include a fluid outlet of the nozzle.

In an embodiment, said welding the nozzle to the arm comprises welding the nozzle to the arm by a groove welding.

According the above-described embodiments, the bottom surface of the arm and the edge of the front-end surface of the nozzle are connected by the weld material with no gap therebetween. In addition, since the nozzle is welded to the arm, screws or bolts for fixing the nozzle are not necessary. Therefore, there exist no raised and recessed portions around the nozzle, and a polishing liquid is less likely to remain on the bottom surface of the arm and on the nozzle. As a result, deposition of dried polishing liquid can be prevented.

DESCRIPTION OF EMBODIMENTS

Embodiments will now be described with reference to the drawings.

Figure 1:
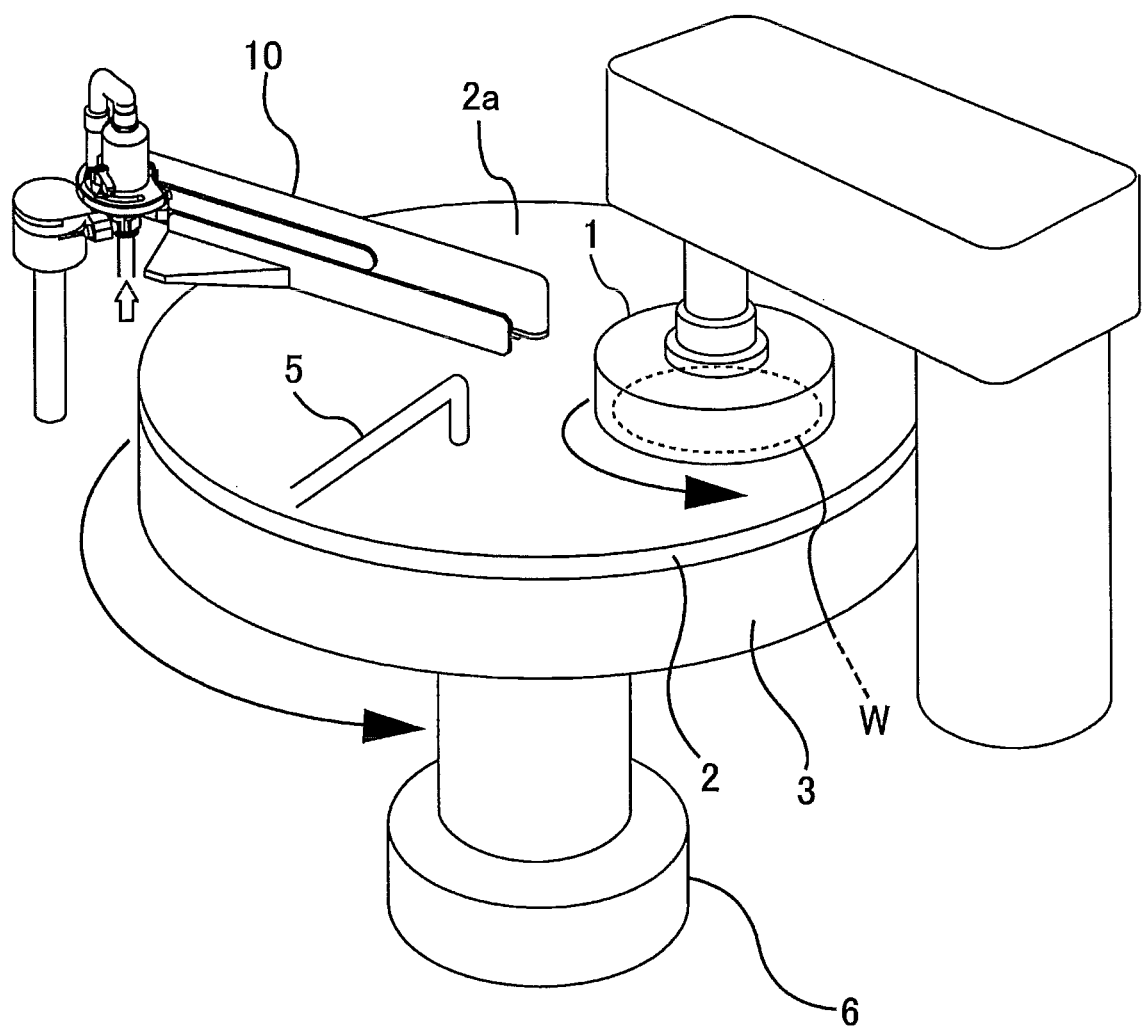
FIG. 1 is a schematic view showing an embodiment of a polishing apparatus having a polishing-surface cleaning apparatus.

FIG. 1 is a schematic view showing an embodiment of a polishing apparatus having a polishing-surface cleaning apparatus. The polishing apparatus shown in FIG. 1 is a CMP apparatus for chemically mechanically polishing a wafer which is an example of a substrate.

As shown in FIG. 1, the polishing apparatus includes a polishing table 3 for supporting a polishing pad 2, a polishing head 1 for pressing a wafer W against the polishing pad 2, a table motor 6 for rotating the polishing table 3, and a polishing-liquid supply nozzle 5 for supplying a polishing liquid (or slurry) onto the polishing pad 2. The polishing pad 2 has a surface that constitutes a polishing surface 2a for polishing the wafer W. The polishing table 3 is coupled to the table motor 6 so that the polishing table 3 and the polishing pad 2 are rotated together by the table motor 6.

The wafer W is polished as follows. The polishing liquid is supplied from the polishing-liquid supply nozzle 5 onto the polishing surface 2a of the polishing pad 2 on the polishing table 3, while the polishing table 3 and the polishing head 1 are rotated in directions indicated by arrows in FIG. 1. The wafer W is pressed against the polishing surface 2a of the polishing pad 2 in the presence of the polishing liquid on the polishing pad 2, while the wafer W is rotated by the polishing head 1. A surface of the wafer W is polished by a mechanical action of abrasive grains contained in the polishing liquid and a chemical action of the polishing liquid.

An atomizer 10, which is a polishing-surface cleaning apparatus, for cleaning the polishing surface 2a after polishing of the wafer W is arranged above the polishing surface 2a of the polishing pad 2. The atomizer 10 is configured to deliver an atomized cleaning fluid (liquid, or a mixture of liquid and gas) onto the polishing surface 2a to thereby clean the polishing surface 2a. In an embodiment, pure water is used as the liquid, and an inert gas (e.g., a nitrogen gas) or a clean air is used as the gas.

Figure 2:
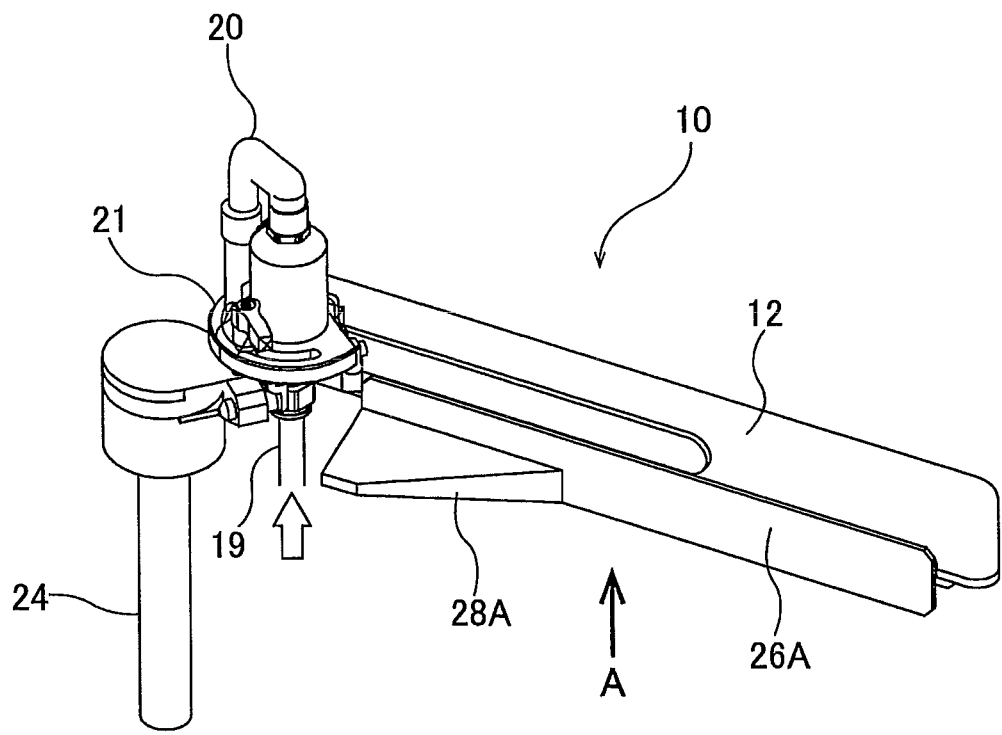
FIG. 2 is a perspective view of an atomizer (i.e., the polishing-surface cleaning apparatus)
Figure 3:
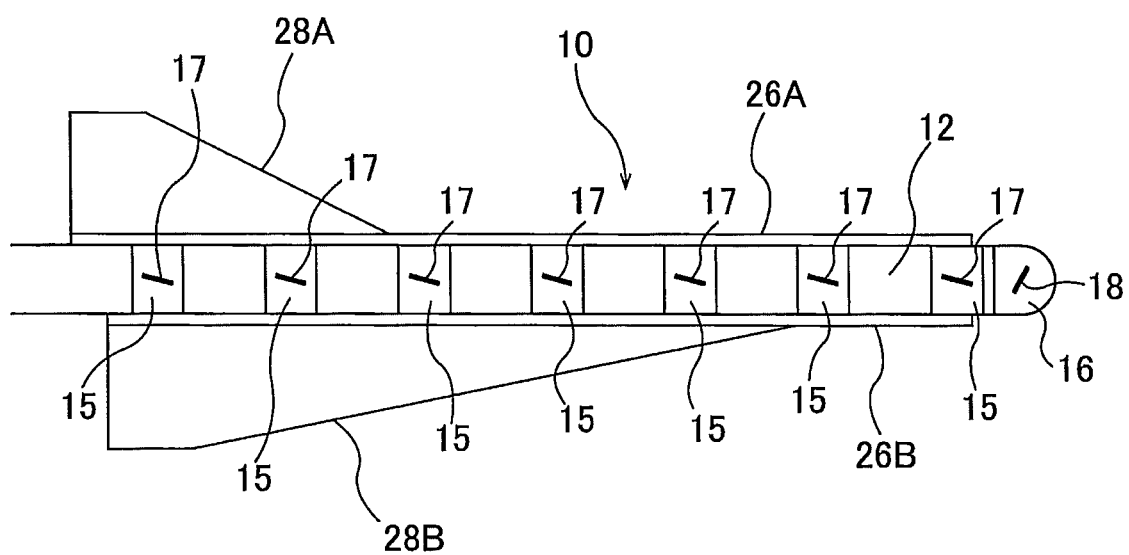
FIG. 3 is a bottom view of the atomizer as viewed from a direction indicated by arrow A in FIG. 2.

FIG. 2 is a perspective view of the atomizer 10, and FIG. 3 is a bottom view of the atomizer 10 as viewed from a direction indicated by arrow A in FIG. 2. As shown in FIG. 2 and FIG. 3, the atomizer 10 includes an arm 12, and a plurality of nozzles 15 secured to the arm 12. Each of the nozzles 15 is configured to form the cleaning fluid into an atomized state and spray the atomized cleaning fluid onto the polishing surface 2a (see FIG. 1). Each nozzle 15 has a fluid outlet 17 in a form of slit.

The arm 12 extends horizontally in a radial direction of the polishing surface 2a. The nozzles 15 are arranged along a longitudinal direction of the arm 12. The nozzles 15 are located in recesses, respectively, which are formed in a bottom surface of the arm 12. A nozzle 16, which has the same structure as the above-described nozzles 15, is arranged in a distal end of the arm 12. This nozzle 16 is also configured to form the cleaning fluid into an atomized state and spray the atomized cleaning fluid onto the polishing surface 2a. The nozzle 16 has a fluid outlet 18 in a form of slit. The nozzle 16 is located at the same height as the nozzles 15.

Figure 4:
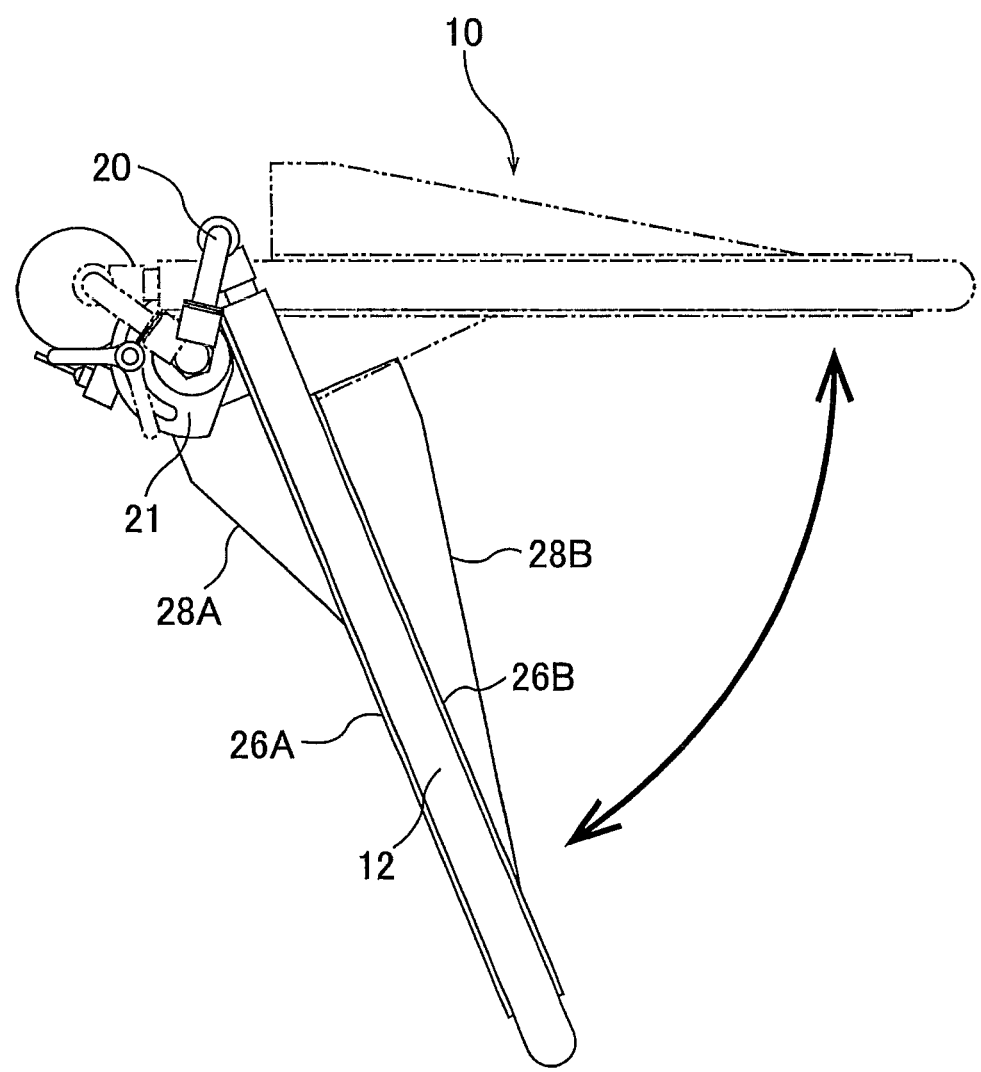
FIG. 4 is a plan view of the atomizer.

The atomizer 10 further includes a fluid inlet 19 for introducing the above-described cleaning fluid into the arm 12, a coupling pipe 20 which couples the fluid inlet 19 to the arm 12, a base 21 which supports the arm 12, and a support shaft 24 which rotatably supports the base 21. As shown in FIG. 4, the arm 12 and the coupling pipe 20 are configured to be able to pivot around the support shaft 24. In general, when the polishing surface 2a is cleaned, the arm 12 is located above the polishing surface 2a, and after cleaning of the polishing surface 2a, the arm 12 is moved to a lateral position of the polishing surface 2a.

Side plates 26A, 26B are fixed to both sides of the arm 12, respectively. These side plates 26A, 26B extend in the longitudinal direction of the arm 12, and further extend downwardly from the bottom surface of the arm 12. The nozzles 15, which are fixed to the arm 12, are located between these side plates 26A, 26B. Projection plates 28A, 28B in a form of wing, which project outwardly, are provided on the side plates 26A, 26B, respectively. The side plates 26A, 26B and the projection plates 28A, 28B are provided for the purpose of preventing the polishing liquid and polishing debris from being scattered when the polishing surface 2a is being cleaned with the cleaning fluid.

Figure 5:
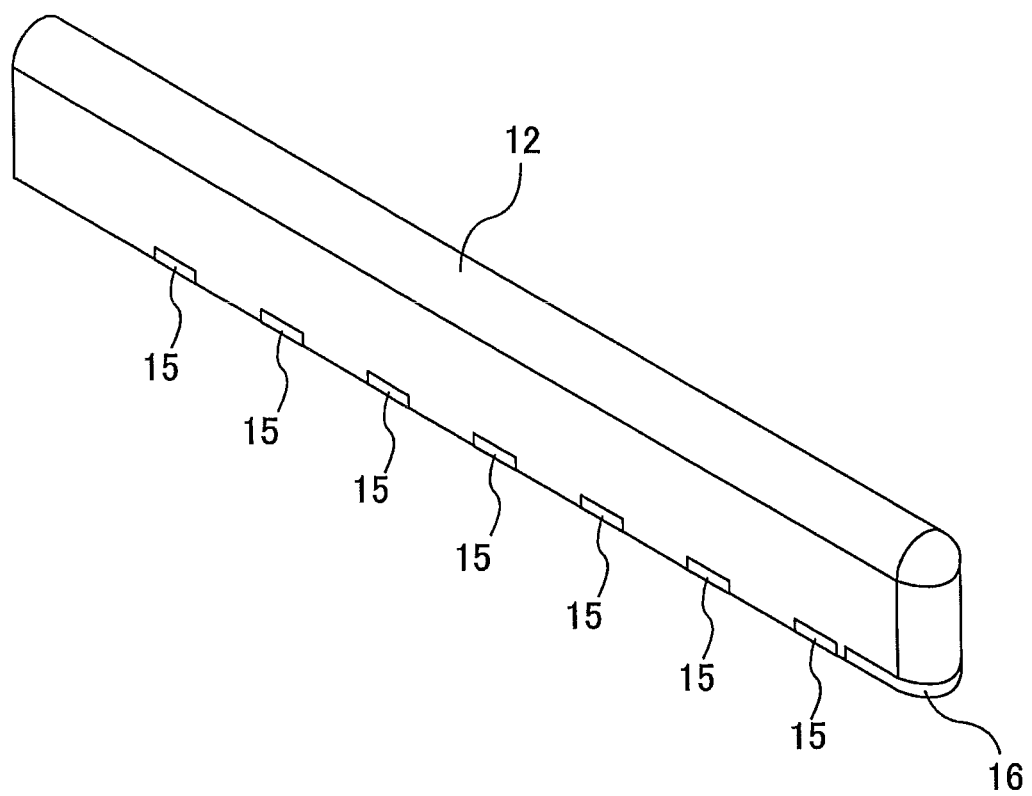
FIG. 5 is a perspective view of an arm as viewed from above.
Figure 6:
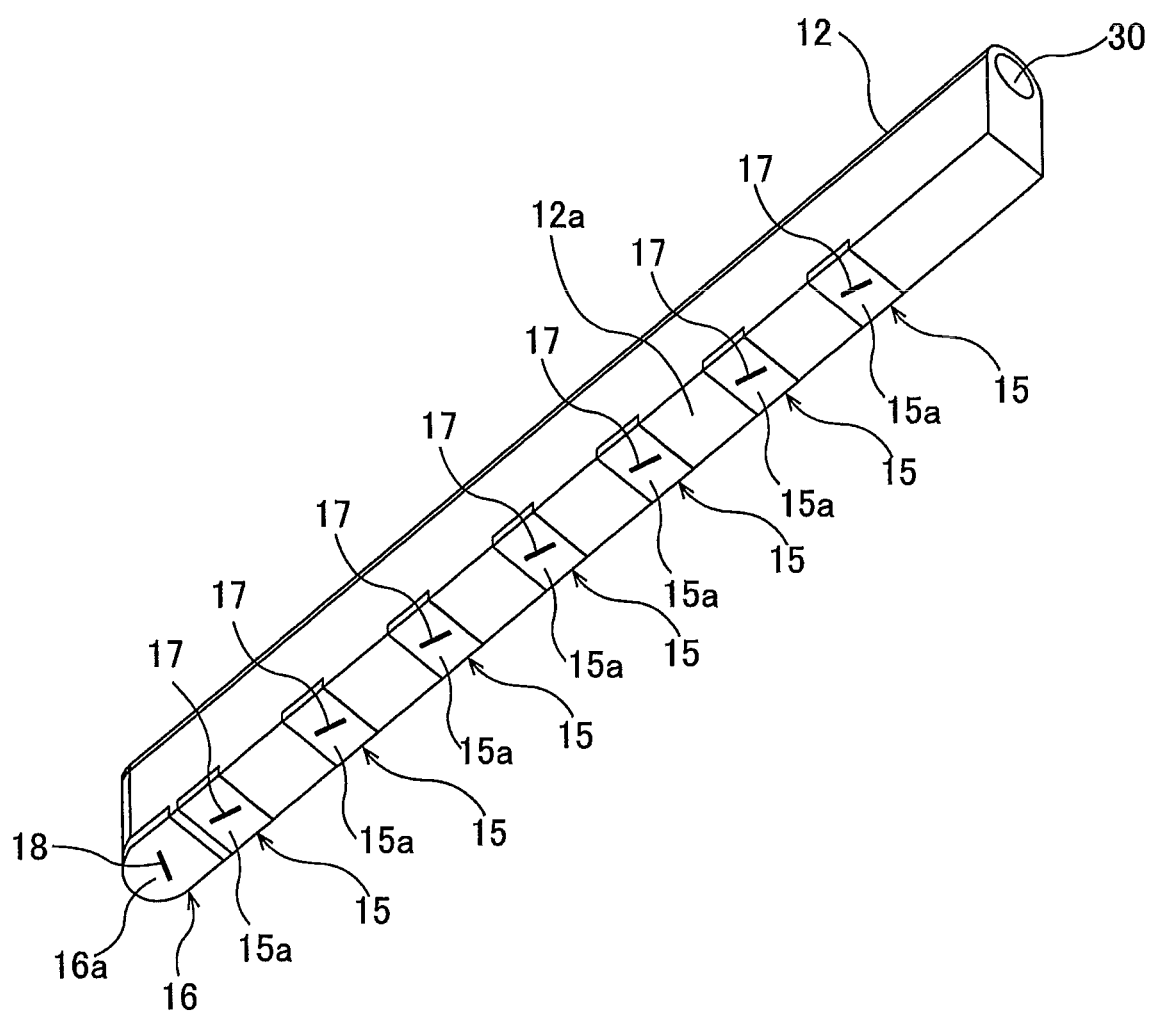
FIG. 6 is a perspective view of the arm as viewed from below.
Figure 7:
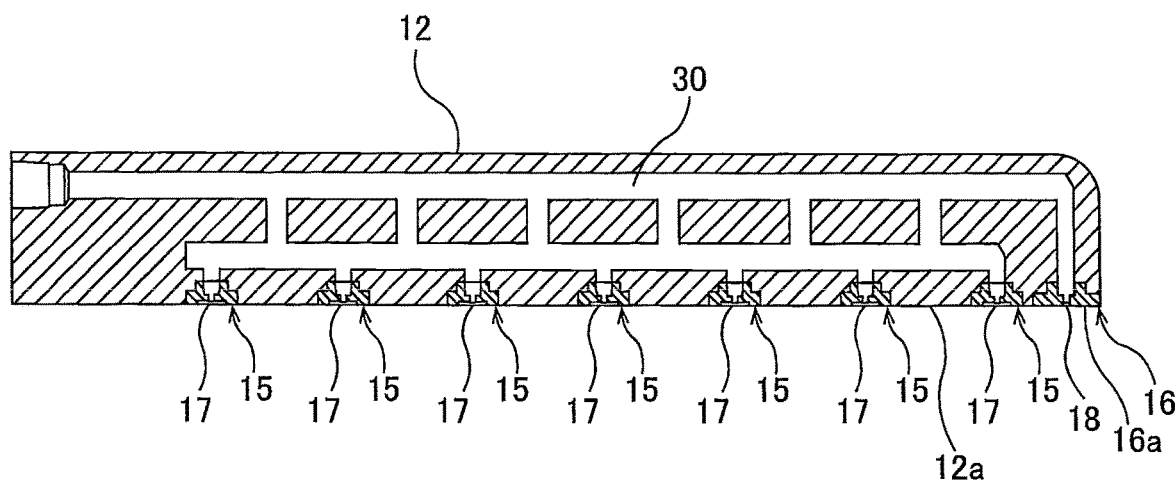
FIG. 7 is a cross-sectional view of the arm.
Figure 8:
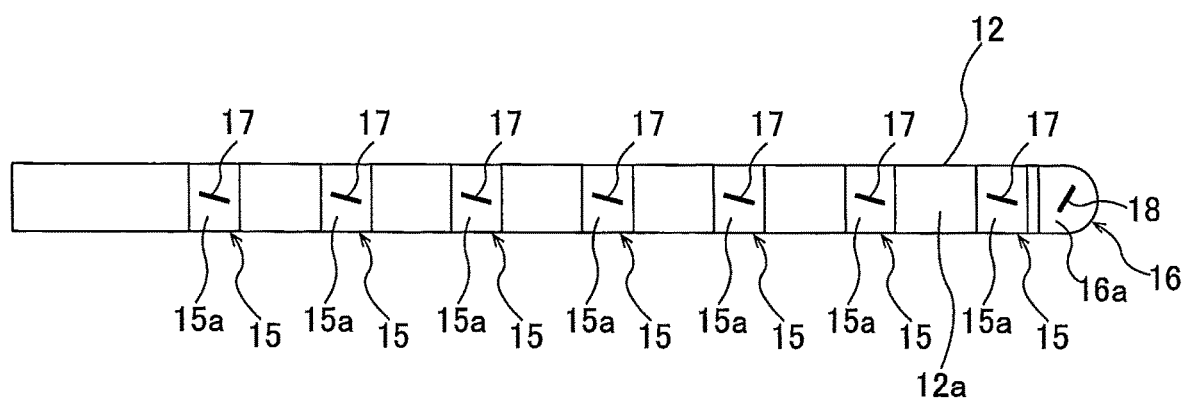
FIG. 8 is a bottom view of the arm.

FIG. 5 is a perspective view of the arm 12 as viewed from above, FIG. 6 is a perspective view of the arm 12 as viewed from below, FIG. 7 is a cross-sectional view of the arm 12, and FIG. 8 is a bottom view of the arm 12. In this embodiment, seven nozzles 15 and one nozzle 16 are secured to a lower portion of the arm 12. However, the number of nozzles 15, 16 is not limited to this embodiment.

All of the nozzles 15, 16 are oriented toward the polishing surface 2a. More specifically, the nozzles 15 and the nozzle 16 are oriented in a direction perpendicular to the polishing surface 2a. The nozzles 15 have front-end surfaces (or bottom surfaces) 15a, and the nozzle 16 has a front-end surface (or a bottom surface) 16a. The front-end surfaces 15a, the front-end surface 16a, and the bottom surface 12a of the arm 12 lie in substantially the same plane.

As shown in FIG. 7, the arm 12 has a fluid passage 30 formed therein. One end of the fluid passage 30 is coupled to the coupling pipe 20 shown in FIG. 2, and all of the nozzles 15, 16 are coupled to the fluid passage 30. The cleaning fluid (e.g., liquid, or a mixture of liquid and gas) is introduced from the fluid inlet 19, shown in FIG. 2, into the atomizer 10. The cleaning fluid flows through the coupling pipe 20 and is supplied into the fluid passage 30 of the arm 12. The cleaning fluid flows through the fluid passage 30 to reach the nozzles 15, 16, and is sprayed from the fluid outlets 17, 18 of the nozzles 15, 16 onto the polishing surface 2a.

The nozzles 15, 16 are fixed to the arm 12 by welding. More specifically, the nozzles 15, 16 are fixed to the arm 12 by groove welding. Next, a method of welding the nozzles 15 to the arm 12 will be described.

Figure 9:
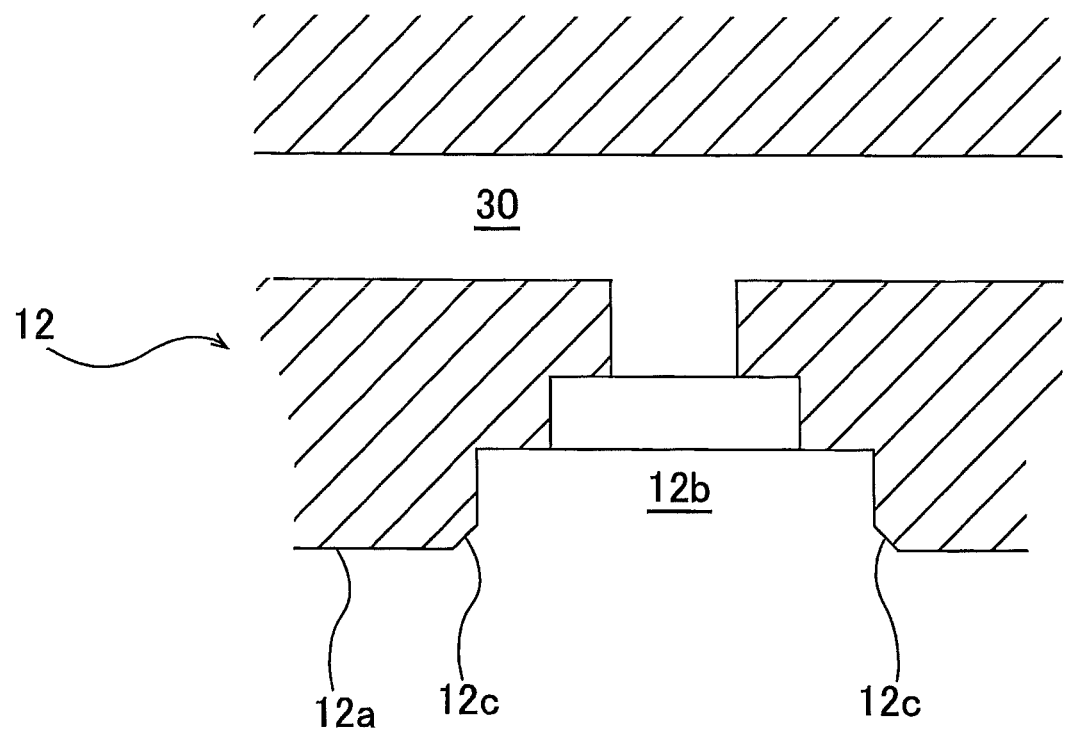
FIG. 9 is a view of a recess formed in a bottom surface of the arm.
Figure 10:
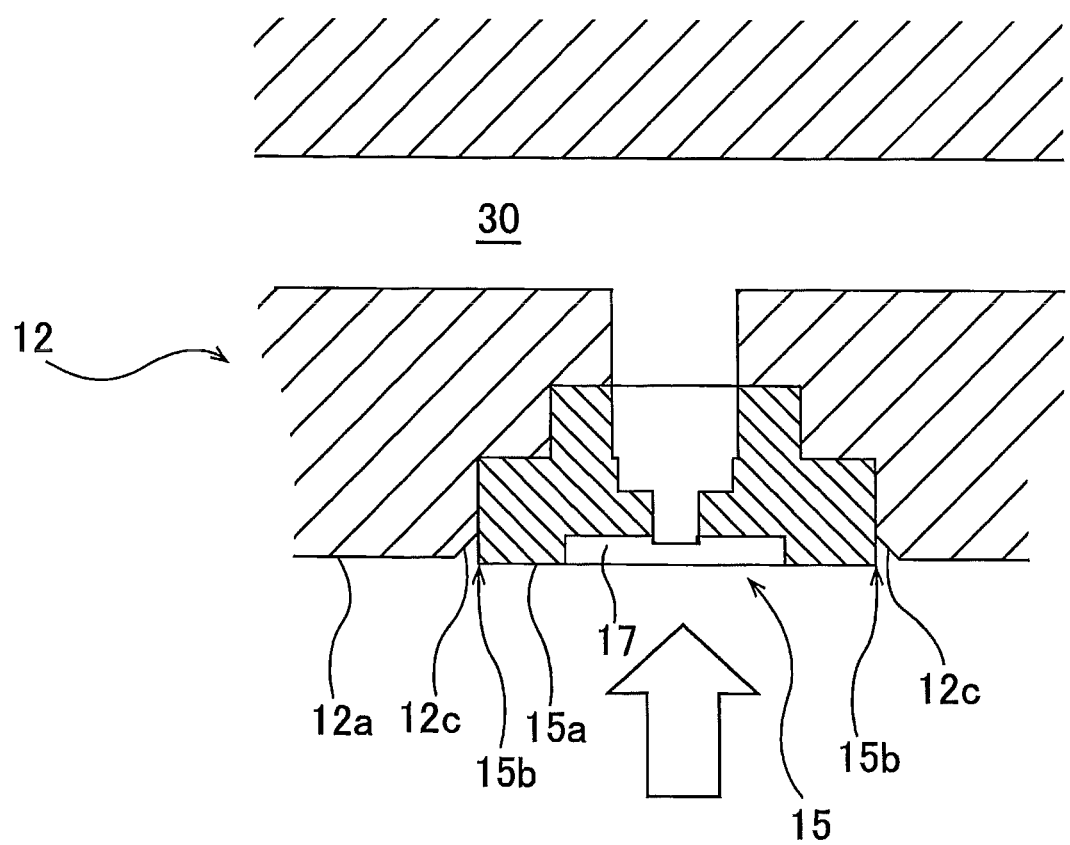
FIG. 10 is a view showing a process of inserting a nozzle into the recess of the arm.

In step 1, as shown in FIG. 9, the arm 12, having the bottom surface 12a in which recesses 12b are formed, is provided. Bevels 12c are formed on edges of each recess 12b. In step 2, as shown in FIG. 10, the nozzle 15 is inserted into each recess 12b until the nozzle 15 is connected to the fluid passage 30 formed in the arm 12. Because of the existence of the bevels 12c formed on the edges of the recess 12b, gaps (or grooves), each in a triangular cross section, are formed between the bottom surface 12a of the arm 12 and the edges 15b of the front-end surface 15a of the nozzle 15.

Figure 11:
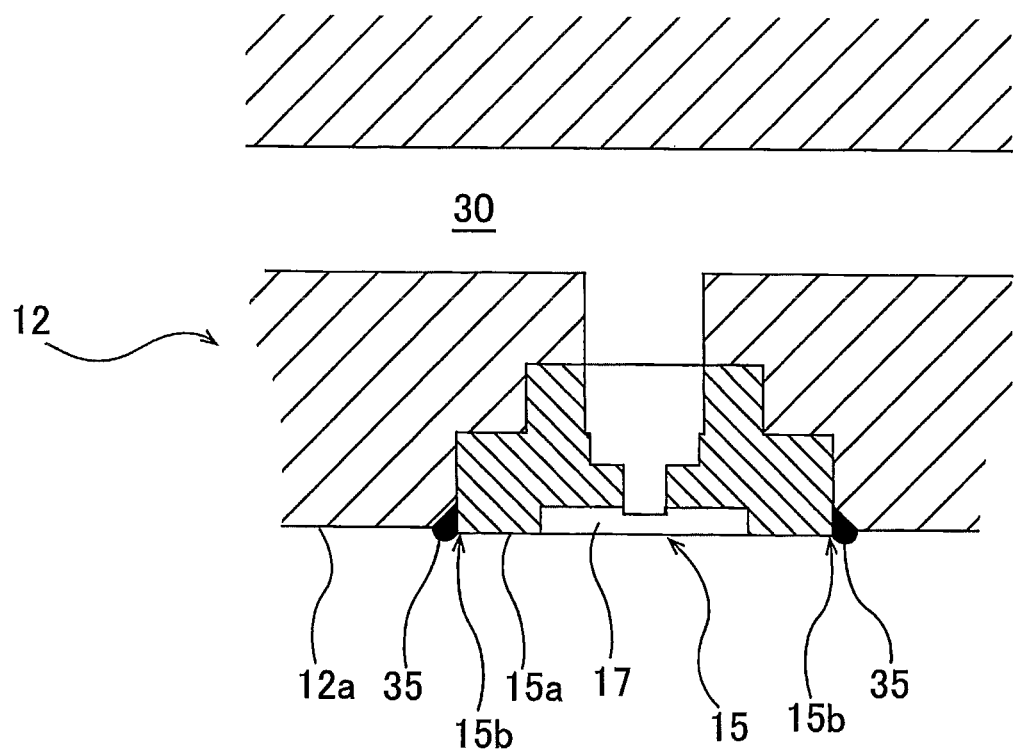
FIG. 11 is a view showing a process of welding the nozzle to the arm.

In step 3, as shown in FIG. 11, each of the nozzles 15 is fixed to the arm 12 by the groove welding. Weld materials 35 are embedded in the above-described gaps, respectively, so that the gaps between the bottom surface 12a of the arm 12 and the edges 15b of the front-end surface 15a of the nozzle 15 are filled with the weld materials 35, respectively. The weld material 35, which is formed by the welding, is called weld bead. In particular, the weld materials 35, which are formed by the groove welding, can fix the nozzle 15 to the arm 12 with a strong fixing strength that can withstand a high pressure of the cleaning fluid. Although not shown in the drawing, both sides of the nozzle 15 are also fixed to both sides of the arm 12 by groove welding. In this embodiment, an entire periphery of an exposed portion of the nozzle 15 is welded to the arm 12, so that a leakage of the cleaning fluid is prevented. In this embodiment, the bevels 12c are formed only on the recess of the arm 12. However, bevels may be formed on both the edges of the front end of the nozzle 15 and the recess of the arm 12, or may be formed only on the edges of the front end of the nozzle 15.

Figure 12:
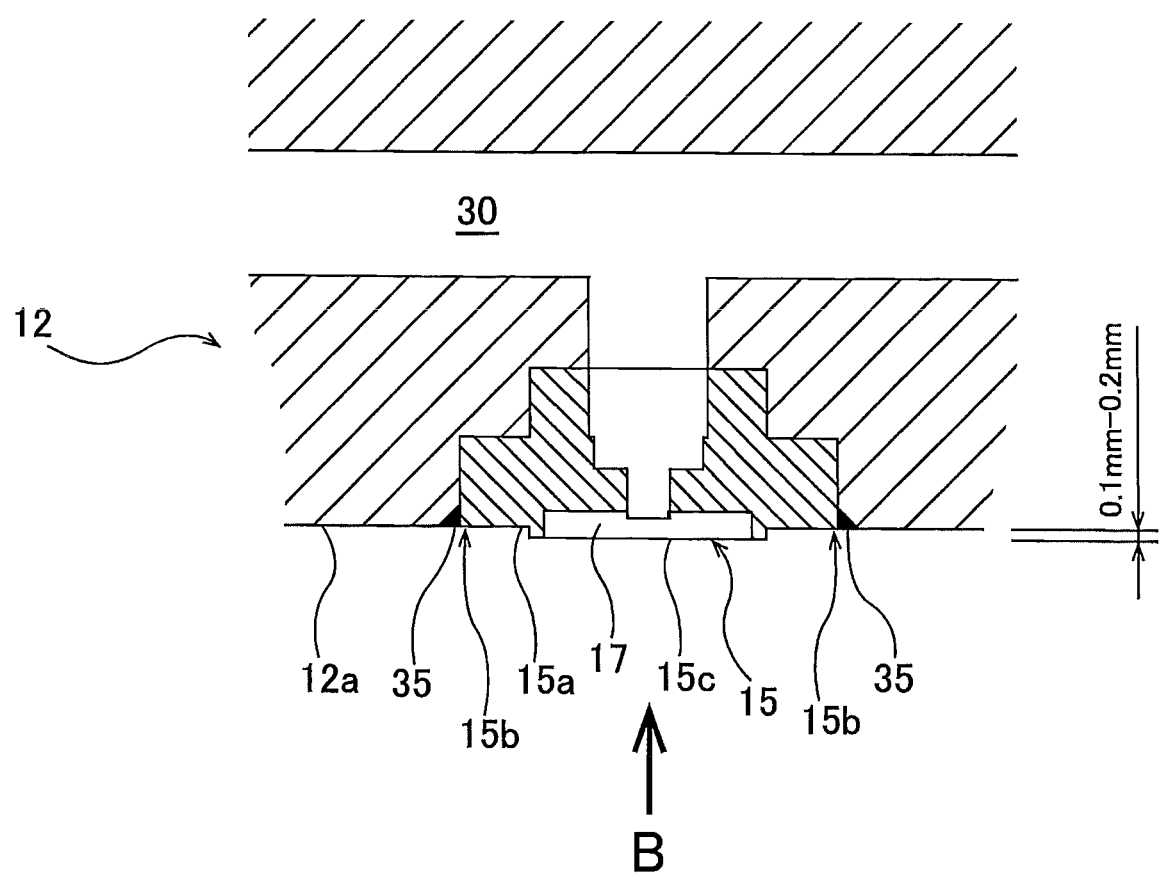
FIG. 12 is a view showing a process of cutting the bottom surface of the arm, a front-end surface of the nozzle, and weld materials.

Further, in order to remove a part of the weld materials 35 that project slightly from the bottom surface 12a of the arm 12 and the front-end surface 15a of the nozzle 15, as shown in FIG. 12, the bottom surface 12a of the arm 12, bottom surfaces of the weld materials 35, and the edges 15b of the front-end surface 15a of the nozzle 15 are cut by a cutting tool, such as a milling cutter, so that the bottom surface 12a of the arm 12, the bottom surfaces of the weld materials 35, and the edges 15b of the front-end surface 15a of the nozzle 15 lie in the same plane. The bottom surface 12a of the arm 12 and the front-end surface 15a of the nozzle 15 are connected with each other by the weld materials 35 with no gap therebetween. The bottom surface 12a of the arm 12, the edges 15b of the front-end surface 15a of the nozzle 15, and the bottom surfaces of the weld materials 35 are constituted by flat surfaces.

Figure 13:
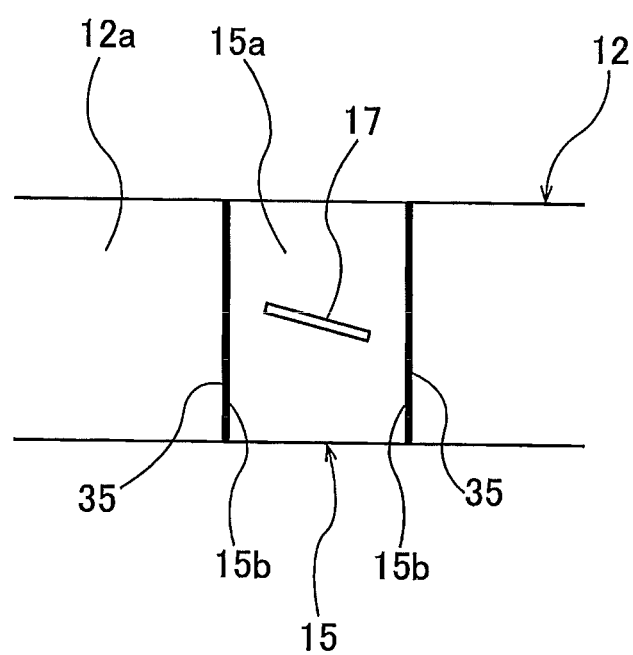
FIG. 13 is a view from a direction indicated by arrow B in FIG. 12.

FIG. 13 is a view from a direction indicated by arrow B in FIG. 12. As shown in FIG. 13, the weld materials 35 extend along the edges 15b of the front-end surface 15a of the nozzle 15, and fill the gaps between the bottom surface 12a of the arm 12 and the edges 15b of the front-end surface 15a of the nozzle 15. Although not shown in the drawings, the nozzle 16 is fixed to the arm 12 through the same process of the nozzles 15 as well.

According to the embodiment, the bottom surface 12a of the arm 12 and the edges 15b of the front-end surface 15a of the nozzle 15 are connected by the weld materials 35 with no gap therebetween. Further, since the nozzle 15 is welded to the arm 12, a screw or a bolt for fixing the nozzle 15 is not necessary. Therefore, there exist no recessed portions and raised portions around the nozzle 15, and the polishing liquid is less likely to remain on the arm 12 and the nozzle 15. As a result, the deposition of dried polishing liquid can be prevented. In addition, since the atomizer 10 is configured such that the polishing liquid is less likely to be attached thereto, maintenance operations and a maintenance time can be reduced.

As a result of cutting the edges 15b of the front-end surface 15a of the nozzle 15, a projecting portion 15c, which protrudes slightly from the bottom surface 12a of the arm 12, is formed on the front-end surface 15a of the nozzle 15, as shown in FIG. 12. The fluid outlet 17 is formed in this projecting portion 15c. As can be seen from FIG. 12, regions of the front-end surface 15a of the nozzle 15 which are cut by the cutting process are regions which include the edges 15b of the front-end surface 15a and do not include the fluid outlet 17 of the nozzle 15. The reason for not cutting the fluid outlet 17 is to prevent deformation of the fluid outlet 17 that can occur as a result of the cutting process and to prevent a decrease in cleaning performance due to the deformation of the fluid outlet 17. From a viewpoint of preventing the attachment of the cleaning fluid, it is preferable that a difference in height between the projecting portion 15c of the nozzle 15 and the bottom surface 12a of the arm 12 be as small as possible. In one embodiment, the projecting portion 15c of the nozzle 15 projects from the bottom surface 12a of the arm 12 by 0.1 mm to 0.2 mm.

Although boundaries between the front-end surface 15a and the projecting portion 15c are not depicted in FIG. 13 because these boundaries are very small stepped portions, the boundaries between the front-end surface 15a and the projecting portion 15c are parallel with the edges 15b of the front-end surface 15a.

During cleaning of the polishing surface 2a, the cleaning fluid is sprayed from the nozzles 15, 16 onto the polishing surface 2a of the polishing pad. In order to prevent the attachment of the polishing liquid scattered from the polishing surface 2a, it is preferable that the bottom surface 12a of the arm 12, the bottom surfaces of the weld materials 35, and the front-end surfaces 15a, 16a of the nozzles 15, 16 be as smooth as possible. Specifically, a surface roughness (an arithmetic average roughness) Ra of the bottom surface 12a of the arm 12, the bottom surfaces of the weld materials 35, and the front-end surfaces 15a, 16a of the nozzles 15, 16 after the cutting process may preferably be less than 3.2 μm.

In this embodiment, the arm 12, the nozzles 15, 16, and the weld materials 35 are made of polypropylene which is synthetic resin. The arm 12, and/or the nozzles 15, 16, and/or the weld materials 35 may be made of water-repellent material in order to more effectively prevent the polishing liquid from being attached to the bottom surface 12a of the arm 12 and the front-end surfaces of the nozzles 15, 16. Alternatively, the bottom surface 12a of the arm 12, and/or the front-end surfaces 15a, 16a of the nozzles 15, 16, and/or the weld materials 35 may be covered with water-repellent material. One example of the water-repellent material is fluorine resin.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. A polishing-surface cleaning apparatus for cleaning a polishing surface with a cleaning fluid, comprising:
   an arm having a fluid passage, the arm extending horizontally;
   a nozzle communicating with the fluid passage, the nozzle having a fluid outlet formed in a front-end surface thereof; and
   a weld material securing the nozzle to the arm, the weld material filling a gap between a bottom surface of the arm and an edge of the front-end surface of the nozzle, an exposed surface of the weld material being covered with water-repellent material, the bottom surface constituting an outer wall of the arm, the exposed surface of the weld material, and the front-end surface of the nozzle lying in substantially a same plane.

2. The polishing-surface cleaning apparatus according to claim 1, wherein the bottom surface of the arm, the exposed surface of the weld material, and the front-end surface of the nozzle lie in the same plane.

3. The polishing-surface cleaning apparatus according to claim 1, wherein a surface roughness Ra of the bottom surface of the arm, the exposed surface of the weld material, and the front-end surface of the nozzle is less than 3.2 μm.

4. The polishing-surface cleaning apparatus according to claim 1, wherein a projecting portion is formed on the front-end surface of the nozzle, and a fluid outlet is formed in the projecting portion.

5. The polishing-surface cleaning apparatus according to claim 4, wherein the projecting portion of the nozzle projects from the bottom surface of the arm by 0.1 mm to 0.2 mm.

6. The polishing-surface cleaning apparatus according to claim 1, wherein the bottom surface of the arm, the front-end surface of the nozzle, and the exposed surface of the weld material are constituted by flat surfaces.

7. The polishing-surface cleaning apparatus according to claim 1, wherein at least one of the nozzle and the arm is made of water-repellent material.

8. The polishing-surface cleaning apparatus according to claim 1, wherein at least one of the front-end surface of the nozzle and the bottom surface of the arm is covered with water-repellent material.

9. A polishing apparatus comprising:
a polishing table for supporting a polishing pad having a polishing surface;
a polishing head configured to press a substrate against the polishing surface; and
a polishing-surface cleaning apparatus according to claim 1.

10. The polishing-surface cleaning apparatus according to claim 1, wherein the water-repellent material is fluorine resin.

* * * * *